US012554396B2

(12) United States Patent
Chiang et al.

(10) Patent No.: US 12,554,396 B2
(45) Date of Patent: Feb. 17, 2026

(54) OPERATION-INDICATION MODE SWITCHING STRUCTURE, CIRCUIT AND METHOD FOR OPERATING THE SAME

(71) Applicant: GETAC TECHNOLOGY CORPORATION, New Taipei (TW)

(72) Inventors: Hsien-Yang Chiang, Taipei (TW); Ta-Wei Chang, Taipei (TW); Cheng-Liang Huang, Taipei (TW); Yeh-Sheng Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 209 days.

(21) Appl. No.: 18/354,552

(22) Filed: Jul. 18, 2023

(65) Prior Publication Data
US 2024/0153719 A1 May 9, 2024

Related U.S. Application Data

(60) Provisional application No. 63/423,453, filed on Nov. 7, 2022, provisional application No. 63/449,272, filed on Mar. 1, 2023.

(51) Int. Cl.
*G06F 3/06* (2006.01)
*G08B 13/196* (2006.01)
(Continued)

(52) U.S. Cl.
CPC .......... *G06F 3/0604* (2013.01); *G06F 3/0655* (2013.01); *G06F 3/0676* (2013.01);
(Continued)

(58) Field of Classification Search
CPC .......... H01H 9/161; H01H 9/16; H04N 7/185; H04N 2213/001; H04N 5/77; H04N 5/772;
(Continued)

(56) References Cited

U.S. PATENT DOCUMENTS 6,519,003 B1 2/2003 Swayze
9,232,134 B2 1/2016 Yuge et al.
(Continued)

FOREIGN PATENT DOCUMENTS

CN 1668073 A 9/2005
CN 101026693 A 8/2007
(Continued)

OTHER PUBLICATIONS

Koelle, et al., "Beyond LED Status Lights-Design Requirements of Privacy Notices for Body-worn Cameras", Tangible,Embedded,And Embodied Interaction,ACM,2 Penn Plaza,Suite 701NEW YORKNY10121-0701USA,Mar. 9, 2018(Mar. 9, 2018), pp. 177-187,XP058387410,DOI:10.1145/3173225.3173234, 11 pages.
(Continued)

*Primary Examiner* — Anthony R Jimenez
(74) *Attorney, Agent, or Firm* — Cooper Legal Group, LLC

(57) ABSTRACT

An operation-indication mode switching structure, a circuit, and a method for operating the same are provided. The operation-indication mode switching structure is disposed on a housing of a device, and includes a switching mechanism that is used to switch multiple operation-indication modes. The switching mechanism is selectively connected with one of multiple signal terminals. When the switching mechanism is manipulated to switch to one of the operation-indication modes, a control unit of the device receives an operation-indication mode switching signal generated by the switching mechanism conducting or circuit-shorting one of the multiple signal terminals. A corresponding operation-indication mode that is a covert mode, a stealth mode, or a normal mode can be determined. The control unit is used to control an indication function of the device according to the operation-indication mode that is switched to.

20 Claims, 6 Drawing Sheets

(51) Int. Cl.
  *G10L 15/22* (2006.01)
  *G10L 21/034* (2013.01)
  *G10L 21/0364* (2013.01)
  *G10L 25/78* (2013.01)
  *H01H 9/16* (2006.01)
  *H04N 7/18* (2006.01)

(52) U.S. Cl.
  CPC ..... *G06F 3/0679* (2013.01); *G08B 13/19621* (2013.01); *G10L 15/22* (2013.01); *G10L 21/034* (2013.01); *G10L 21/0364* (2013.01); *G10L 25/78* (2013.01); *H01H 9/161* (2013.01); *H04N 7/185* (2013.01); *G10L 2025/786* (2013.01)

(58) Field of Classification Search
  CPC ...... H04N 5/907; H04N 7/181; H04N 9/8205; H04N 23/65; H04N 23/661; H04N 23/54; H04N 23/57; H04N 23/60; H04N 23/66; H04N 23/90; H04N 7/18; G10L 2025/786; G10L 25/78; G10L 15/22; G10L 21/034; G10L 21/0364; G08B 13/19621; G08B 13/196; G06F 3/0604; G06F 3/0655; G06F 3/0676; G06F 3/0679; G06F 3/06; B27L 1/05; B27L 1/08; A41D 1/002; A41D 1/02; A41D 2400/48; G06V 20/10; G06V 20/41
  USPC ........................................................ 200/310
  See application file for complete search history.

(56) References Cited

U.S. PATENT DOCUMENTS

| | | | |
|---|---|---|---|
| 9,661,283 | B2 | 5/2017 | Yokomitsu et al. |
| 9,706,101 | B2* | 7/2017 | Kaneda .................. H04N 23/62 |
| 10,446,183 | B2 | 10/2019 | Smith et al. |
| 2001/0005229 | A1 | 6/2001 | Misawa et al. |
| 2002/0144882 | A1* | 10/2002 | Yamaguchi .......... H01H 25/008 |
| | | | 200/4 |
| 2005/0087702 | A1 | 4/2005 | Ford et al. |
| 2005/0200738 | A1 | 9/2005 | Song |
| 2016/0196693 | A1 | 7/2016 | Kobayashi et al. |
| 2016/0227173 | A1 | 8/2016 | Yamaguchi et al. |
| 2016/0286156 | A1 | 9/2016 | Kovac |
| 2019/0266881 | A1 | 8/2019 | Vonfrolio |
| 2019/0342653 | A1 | 11/2019 | Zhou |

FOREIGN PATENT DOCUMENTS

| | | |
|---|---|---|
| CN | 209913899 U | 1/2020 |
| TW | 202113561 A | 4/2021 |

OTHER PUBLICATIONS

Search Report issued on Apr. 4, 2024 for EP application No. 23188628.4, 10 pages.

* cited by examiner

OPERATION-INDICATION MODE SWITCHING STRUCTURE, CIRCUIT AND METHOD FOR OPERATING THE SAME

CROSS-REFERENCE TO RELATED PATENT APPLICATION

This application claims the benefit of priorities to the U.S. Provisional Patent Application Ser. No. 63/423,453, filed on Nov. 7, 2022 and Ser. No. 63/449,272, filed on Mar. 1, 2023, which applications are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of indicating operations of a switching device, and more particularly to a switching structure, a circuit and an operating method for the switching device that can be operated under operation-indication modes with various hidden indication functions.

BACKGROUND OF THE DISCLOSURE

It is common for an electronic device to provide various indication functions such as light-emitting diode (LED) lights to indicate an operating status of the electronic device. For example, the LED lights can be used to indicate a current operating status of the electronic device through a constant light, a flashing light, a breathing light, or a color-changing light. The electronic device can also use a buzzer or a speaker to produce sounds having a specific frequency or a specific volume for indicating a current operating status of the electronic device. Further, the electronic device can use a vibration to indicate a current operating status, or the electronic device can include a display screen that can be used to show an operating status of the electronic device through a text or a pattern displayed on the display screen.

However, when the electronic device is required to be operated under an extremely quiet environment or to be hidden under a covert mode, the above-mentioned indication functions will cause unwanted disturbance. For example, when a person wearing the device needs to secretly conduct a specific task, the above-mentioned indication functions such as the lights, vibration, sound, or luminosity of the display screen may expose the person's location.

SUMMARY OF THE DISCLOSURE

For an electronic device to operate while hiding all or part of operation-indication functions, the present disclosure provides a structure and a circuit allowing a user to conveniently manipulate to switch operation-indication modes. For example, in an audiovisual recording device, when the audiovisual recording device is in operation, the structure and the circuit for switching the operation-indication functions disposed in the audiovisual recording device allow the user to instantly switch to one of multiple operation-indication modes for indicating the operation of the audiovisual recording device when needed.

In one aspect of the present disclosure, an operation-indication mode switching structure is disposed on a housing of the device. The switching structure includes a switching mechanism that is used to switch the multiple operation-indication modes of the device. The switching mechanism is used to be selectively connected with one of multiple signal terminals in the device. The signal terminals are electrically connected with a control unit of the device. According to an operation performed by the user or a determination executed by the device, when the control unit receives an operation-indication mode switching signal generated by the signal terminal that is conducted or short-circuited by the switching mechanism, the operation-indication mode switching signal corresponds to one of the multiple operation-indication modes, and the control unit controls multiple indication functions according to one of the multiple operation-indication modes to be switched to.

Preferably, the switching mechanism achieves switching the operation-indication mode in an electrical manner or in a mechanical manner. For example, the switching mechanism can be a lever for being switched to one of multiple positions, so as to conduct or to short-circuit one of the multiple signal terminals.

Preferably, the indication functions of the device include one or more indication lights, an indication sound, a vibration signal, and displaying an operating status of the device via a display unit.

Further, according to one of the embodiments, the operation-indication modes include a covert mode, a stealth mode, and a normal mode. In one embodiment of the present disclosure, under the covert mode, the control unit turns off all of the indication functions of the device; under the stealth mode, the control unit turns off part of the indication functions of the device; and, under the normal mode, the control unit turns on all of the indication functions of the device.

In one embodiment of the operation-indication mode switching circuit of the present disclosure, the switching circuit mainly includes a control unit and a mode-switching switch. The mode-switching switch includes the operation-indication mode switching structure.

Further, according to certain embodiments of the operating method of the operation-indication mode switching circuit, when the device is in operation, the control unit turns on multiple operation-indication functions. The control unit determines a corresponding one of the multiple operation-indication modes when the control unit receives the operation-indication mode switching signal that is generated when the user manipulates the operation-indication mode switching structure to switch to one of the operation-indication modes. The control unit turns on or off one or more of the multiple operation-indication functions according to the corresponding one of the multiple operation-indication modes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
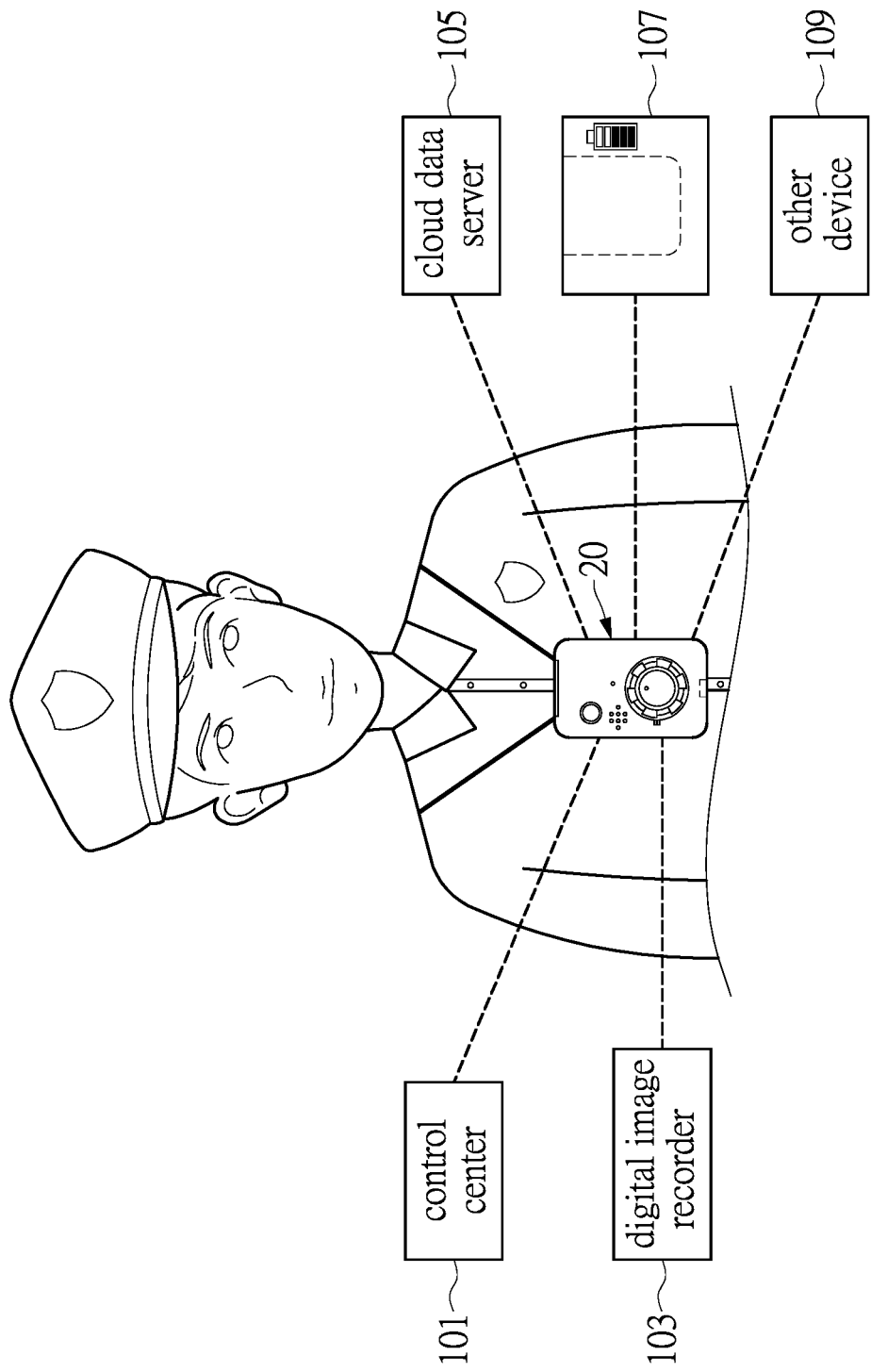
FIG. 1 is a schematic diagram illustrating a framework of a body-wearable camera and a system applying the body-wearable camera according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure is related to an operation-indication mode switching structure, a circuit, and an operating method thereof. One of the functions of the operation-indication mode switching structure is to control an operation-indication function that indicates a current operation mode of a device. In addition to several practical operation modes operated in the device, the operation-indication mode switching structure, the circuit, and the operating method are provided for the device to be operable under various modes for concealing the indication functions.

For example, the device can be operated under a covert mode or a stealth mode. One of the scenarios of application is to apply the covert mode or the stealth mode to a body-wearable camera that is worn by a specialized person such as a policeman or a security that needs to collect evidence at any time. The body-wearable camera can be worn on the chest of the person, or disposed on a safety helmet, a steel helmet or glasses of the person. In addition to the requisite functions of videography (e.g., audio and video recording, noise reduction, high image quality, and wide viewing angle) and storage, the body-wearable camera provides additional features such as long time operation (e.g., providing a large capacity battery), a power-saving mode, a black-box function of long-term continuous video recording for evidence collection, indication functions with a display screen, lights, and sounds, a data-encryption function, a communication function (e.g., mobile communication, Bluetooth °, or Wi-Fi), integration in a digital video recorder (DVR), an emergency alerting function, having various sensors (e.g., a GPS circuit, an accelerometer, and/or a gyroscope), a robust structure that is waterproof, dust-proof, and shockproof, and multiple manipulation functions by using buttons, a lever, and/or a rotatable wheel, etc.

A system adopting the body-wearable camera is described as follows. The body-wearable camera can be used in conjunction with a control center for remote positioning, live video streaming, remote controlling (e.g., remotely initiate recording), emergency notification, contacting service crews, and operating with an application of a mobile device.

A device that adopts the operation-indication mode switching structure of the present disclosure can be referred to in a schematic diagram of FIG. 1, which is a schematic diagram illustrating a framework of a body-wearable camera and a system applying the body-wearable camera according to one embodiment of the present disclosure.

In FIG. 1, a body-wearable camera 20 is such as a device worn by a person for recording and collecting surrounding evidences through video and sound. The body-wearable camera 20 is required to record the video in full. The operating status of the body-wearable camera 20 can be information such as a battery level or a memory capacity, or can be a state of the camera such as recording, recording being stopped, or recording a critical video that can be indicated by various indication lights, an indication sound, a vibration signal, and/or displaying an operating status of the device via a display unit.

According to one embodiment of the present disclosure, the body-wearable camera 20 is capable of communicating with a control center 101, so that the person wearing the body-wearable camera 20 can communicate with the control center 101 at any time. Furthermore, the body-wearable camera 20 can be remotely controlled by the control center 101. For example, the control center 101 can remotely control an operation mode of the body-wearable camera 20. Further, the control center 101 can provide a livestream video via the body-wearable camera 20.

The body-wearable camera 20 can be locally connected with a digital video recorder (DVR) 103. The digital video recorder 103 is a device with mass storage and multiple transmission terminals, and the digital video recorder 103 is able to connect with multiple cameras so as to store the video data generated by the multiple cameras. Thus, when the body-wearable camera 20 is in operation, a recorded video can be transmitted to the digital video recorder 103 in real-time or with a backup file that is produced later. On the other hand, the body-wearable camera 20 may further have a network transmission function that can disconnect from or connect with a cloud data server 105 for transmitting the video to the cloud data server 105.

The body-wearable camera 20 has a terminal that is able to transmit data and used for charging as connecting with a charging device 107 via a charging interface with a specific format. The terminal can also be used in conjunction with another device 109. For example, the body-wearable camera 20 worn by a soldier or a policeman can be coupled with a gun armed by the soldier or the policeman, so that the body-wearable camera 20 can be activated to start recording for evidence collection if a sensor senses that the gun is drawn by the soldier or the policeman.

Under a normal mode of the body-wearable camera 20, various operation-indication functions such as lights, a sound, a vibration, and a content to be displayed can be used to indicate an operating status of the body-wearable camera 20. However, these indication functions may expose locations of a person performing a covert mission and cause the mission to fail. Therefore, it is necessary to conveniently and immediately set a covert mode to turn off the operation-indication functions.

Figure 2A:
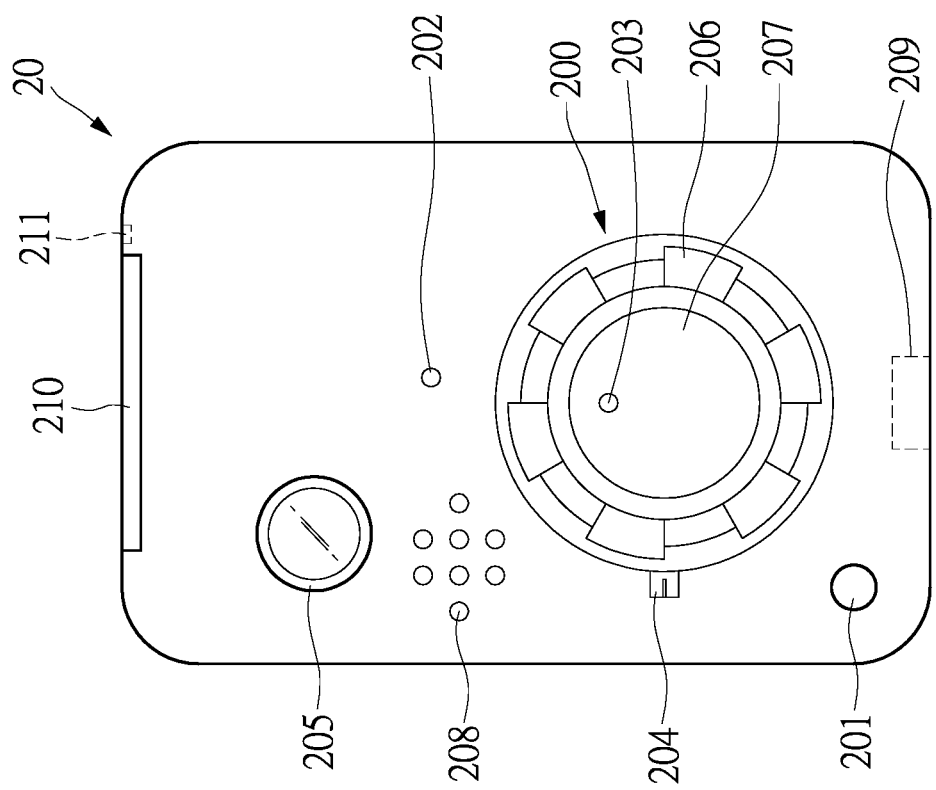
FIG. 2A and FIG. 2B are schematic diagrams illustrating a structure of the body-wearable camera according to one embodiment of the present disclosure.
Figure 2B:
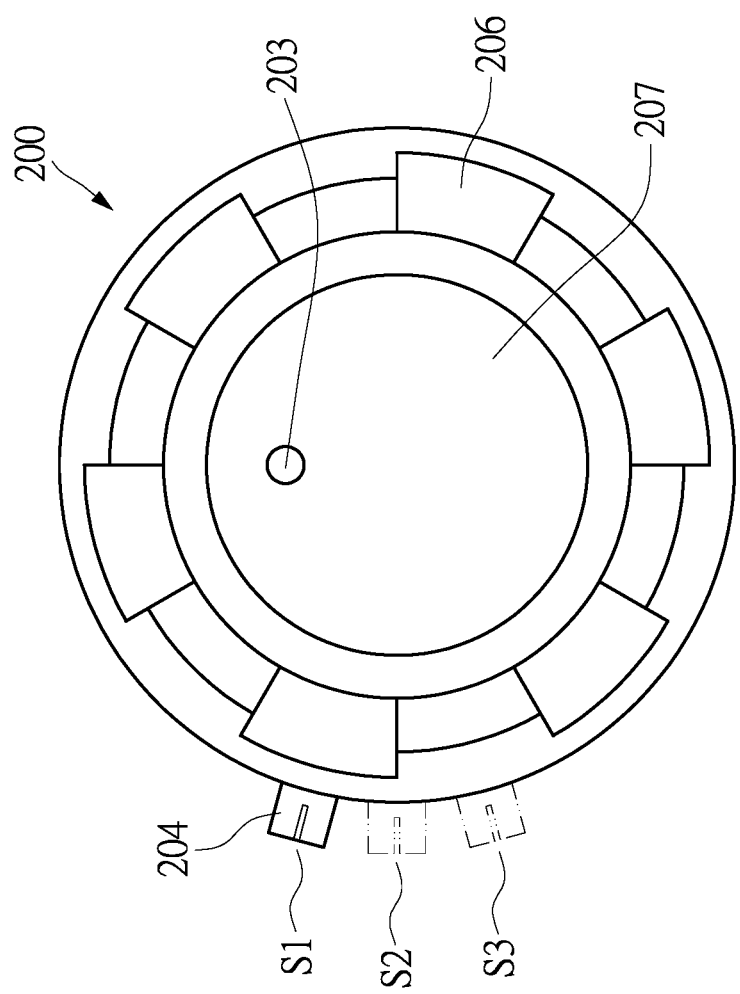

Reference is made to FIG. 2A and FIG. 2B, which are schematic diagrams illustrating a structure of the body-wearable camera according to one embodiment of the present disclosure.

FIG. 2A is a schematic diagram illustrating an exterior structure of the body-wearable camera 20 in one embodiment of the present disclosure. The body-wearable camera 20 includes a control interface 200 that provides various control functions. The control interface 200 is used to control operational functions of the body-wearable camera 20 in a mechanical manner or in an electrical manner. It should be noted that the embodiments are only used to illustrate a main operation interface and prompting functions of the body-wearable camera 20, and it is not meant to limit a practical implementation of the present disclosure.

According to one embodiment of the present disclosure, the body-wearable camera 20 includes a camera lens 205 that is disposed on the exterior structure of the body-wearable camera 20. The body-wearable camera 20 includes a circuit for image retrieving and processing for capturing a video. The body-wearable camera 20 has a speaker outlet 208 that is connected with an internal circuit for audio processing and outputting a voice and a sound. The body-wearable camera 20 includes a microphone 202 that is connected with an internal circuit for audio receiving and processing, so as to record surrounding sounds. The body-wearable camera 20 also includes a display 210 that can be an LED display or an OLED display. The display 210 is used to indicate an operating status of the device by using texts or graphics. The body-wearable camera 20 includes a socket interface 209 that is used to connect with an external device or a power source.

Furthermore, the body-wearable camera 20 provides a control interface 200 that implements a multi-functional switch through a mechanical design. As shown in the diagram of the present disclosure, the control interface 200 includes a main switch 207, a wheel switch 206, and a mode-switching switch 204. The main switch 207 of the control interface 200 allows a user to touch or press the main switch 207 for activating the device to start or stop recording. A power switch 201 that is electrically connected with an internal power-management circuit is provided for turning on or turning off the body-wearable camera 20. A second indication light 211 can be used to indicate the operating status of the device by emitting light signals. The body-wearable camera 20 supports a function of power-on recording. That is, the body-wearable camera 20 starts recording when the main switch 207 is pressed, until the device is turned off, or recording is stopped. According to one embodiment of the present disclosure, the power switch 201 can also be used to activate or shutdown a network connection function of the device.

According to an exemplary example shown in the diagram, the body-wearable camera 20 provides one or more indication lights such as the aforementioned second indication light 211 and a first indication light 203 displayed on the control interface 200. The indication lights can be implemented by LEDs that can be used to indicate the user the operating status of the device by lighting up the lights, turning off the lights, flashing the lights, or changing colors of the lights. The aforementioned first indication light 203 and the second indication light 211 can be used in conjunction for indicating a recording status, a charging status, a memory usage status, and a status of the device being turned on or off.

According to one embodiment shown in the diagram of the present disclosure, the control interface 200 includes the wheel switch 206 that is provided for the user to switch to different functions by rotating the wheel switch 206 in clockwise or counterclockwise directions. The wheel switch 206 can be used to mechanically set up multiple rotation gear positions, and the wheel switch 206 uses a magnetic-controlled switch that can be switched to any of the multiple rotation gear positions. Each of the rotation gear positions is connected with a specific circuit terminal. A signal is generated when any of the rotation gear positions is conducted, and the control unit of the body-wearable camera 20 can determine a corresponding function.

One of the functions of the wheel switch 206 is that, the user can rotate the wheel switch 206 to select one of the categories of a video clip when the device is in operation. The video clip may be categorized to a specific category for future reference when a video file is created after the recording is stopped. For example, the category of the video clip can be set as an accident when the user determines that the instant scene is an accident scene. Accordingly, the user can rotate the wheel switch 206 to a gear position of an accident event. At this time, a prompting sound is output via a speaker outlet 208. The video is set as an accident event when the video is stored. The category of the video can be an emergency event, and therefore the wheel switch 206 can be rotated to set the category of the recorded video as the emergency event when it is determined that the event is an emergency event. Similarly, the category of the video can be a violence event, and therefore the wheel switch 206 can be rotated to set the category of the recorded video as the violence event when it is determined that a violence event such as robbery has occurred. Further, the category of the video can be a speeding event, and therefore the wheel switch 206 can be rotated to a gear position of the speeding event when the user determines that the category of the recorded video is a speeding event. Therefore, the category of the recorded video is set as the speeding event. Still further, the category of the video can be a disturbance event, and therefore the wheel switch 206 is rotated to a gear position of the disturbance event when it is determined that the video is about a disturbance event such as a public protest. Further, the category of the video can be an arrest event, and therefore the wheel switch 206 is rotated to a gear position of the arrest event when it is determined that the video is about an arrest event. Accordingly, the video is categorized as an arrest event.

Figure 3:
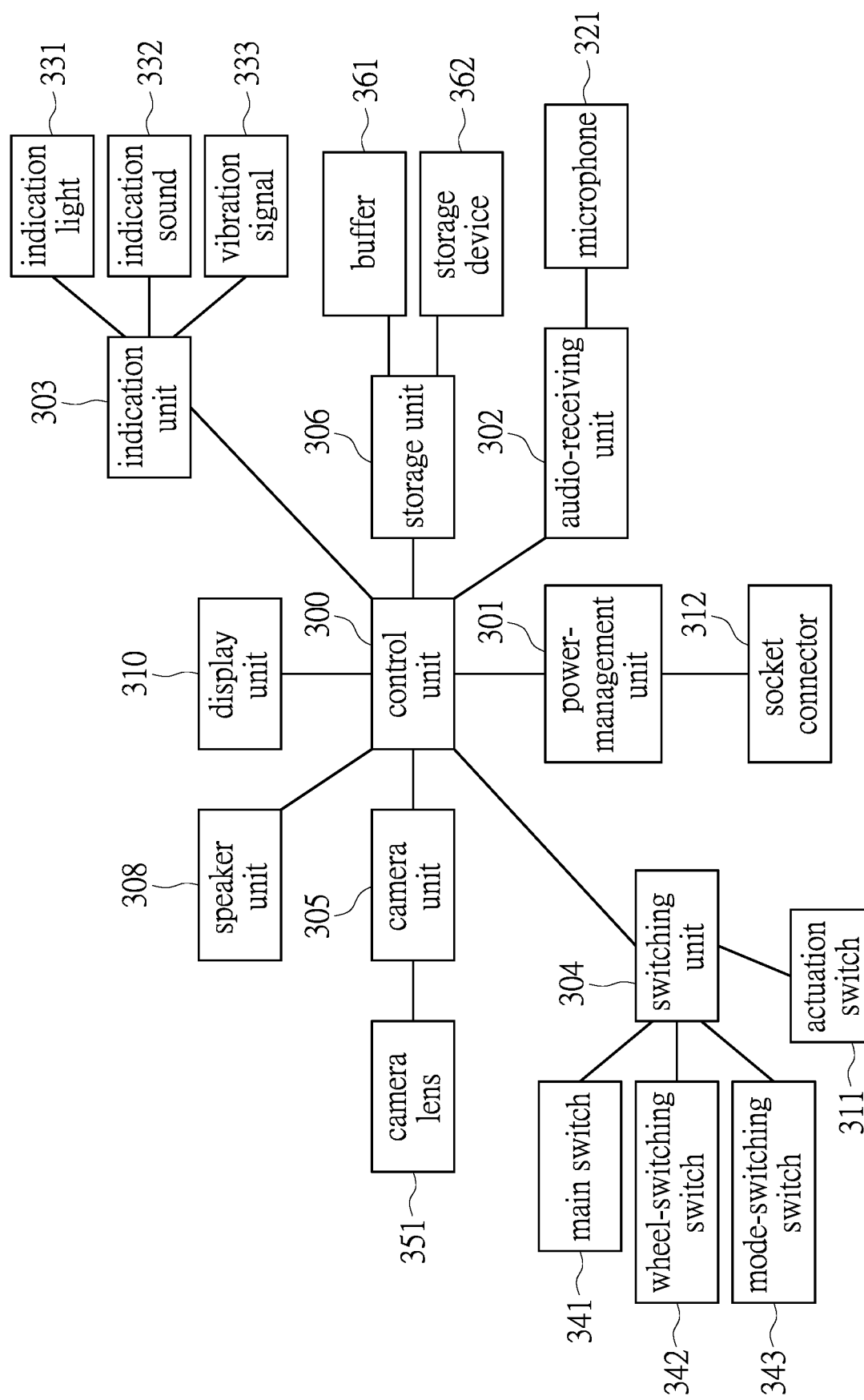
FIG. 3 is a schematic diagram illustrating various internal components of the body-wearable camera according to one embodiment of the present disclosure.

The functions of the device as shown in FIG. 2A can be referred to in FIG. 3, which is a schematic diagram illustrating various internal components of the device. The blocks shown in the diagram can be circuit components and software components. As shown in the diagram, a control unit 300 of the device is provided for controlling operations of the device. The control unit 300 can be implemented by a microcontroller inside a body-wearable camera, and other circuit components are electrically connected with the control unit 300.

The device can be a portable device that is powered by a battery. The device includes a power-management unit 301 that is electrically connected with the control unit 300 for managing the power supplied to the device, and the power-management unit 301 is also electrically connected with a socket connector 312. The device is preferably an audiovisual recorder that includes an audio-receiving unit 302 for receiving external audio by a microphone 321, and a camera unit 305 for capturing images through a camera lens 351. A display unit 310 of the device is used to display operating status of the device. A speaker unit 308 of the device is used to output a prompting sound.

The device includes a storage unit 306. The storage unit 306 includes a storage device 362 for storing audiovisual data. The storage device 362 can be implemented by a non-volatile memory such as a flash memory or a solid state drive (SSD). Furthermore, the storage unit 306 includes a buffer 361 for buffering the audiovisual data when the device is used for video recording.

According to one embodiment of the present disclosure, for the buffer 361, the body-wearable camera can be a portable video recorder that is worn by a soldier, a policeman, or a person performing a specific task. One of the objectives of the video recorder is to collect a full audiovisual data at critical moments without losing any critical image. The completeness of the audiovisual data needs to be guaranteed so that the audiovisual data can be effective evidences. In addition to power requirement, the device is required to have the function of long-term video recording. The storage unit 306 can be implemented by software and firmware operating in the circuit, or a collaboration of software and hardware, so as to continuously record a video. A storage medium can be a random access memory (RAM) or other memories of a circuit system. Furthermore, the storage medium can be implemented by the buffer 361. According to one embodiment of the present disclosure, when the device continuously receives the data (e.g., a video, an audio, or a combination thereof) via the camera unit 305 and the audio-receiving unit 302, the data can be sequentially buffered to the buffer 361 in a first-in-first-out (FIFO) manner, and then stored to the storage device 362 according to an instruction. Alternatively, the data can directly form a livestream video that is transmitted to the control center 101 as shown in FIG. 1.

Further, the device includes an indication unit 303 that allows the user to acknowledge the operating status of the device by a displayed image, lights, or sounds. The various indication functions are controlled by circuits or software. For example, an indication light 331 can be implemented by LEDs, an indication sound 332 can be generated by a buzzer or a speaker, and a vibration signal 333 can be generated by an internal vibrator.

In the diagram, the device provides various switches to control operations of the device. For example, a switching unit 304 electrically connected with the control unit 300 generates a signal that allows the control unit 300 to decide an operation mode of the device. References are made to both FIG. 2A and FIG. 2B, in which the switching unit 304 includes an actuation switch 311, a main switch 341, a wheel-switching switch 342, and a mode-switching switch 343 that can be implemented in a mechanical manner or in an electrical manner.

In an exemplary example, when a user presses the actuation switch 311, the switching unit 304 generates a power-on signal that is provided to the control unit 300 so as to drive the power-management unit 301 to power on the device. The user can also manipulate the main switch 341 to immediately start to record a video. The device can generate the vibration signal 333 or the indication sound 332 (e.g., a beep sound) for indicating that the device is booting up. The device can use a color of the indication light 331 or flashing of the indication light 331 to indicate that the device is recording. When the power supplied to the operating device drops to a low threshold, the indication light 331 is used to indicate a power state of the device with a specific color or a flashing light. The various operating statuses of the device can also be indicated for the user by a pattern or a text displayed on the display unit 310. However, the above-mentioned lights, sounds, or displayed content may cause disturbance when the locations of the user is required to be hidden. Accordingly, the operation-indication mode switching structure and the circuit are provided.

According to one embodiment of the present disclosure, the above-described control interface 200 provides the mode-switching switch 204, and the design and functions of the mode-switching switch 204 can be referred to in the schematic diagram of FIG. 2B.

As shown in the diagram, the control interface 200 is disposed on a housing of the body-wearable camera. The control interface 200 includes the first indication light 203, the main switch 207, the wheel switch 206, and the mode-switching switch 204. The mode-switching switch 204 is such as a switching mechanism used to switch the multiple operation-indication modes of the device. The switching mechanism can be switched to multiple gear positions. For example, the switching mechanism as shown in the diagram can be a lever that is able to be switched to the multiple gear positions for being selectively connected with any of the signal terminals that are electrically connected with the control unit of the device.

Figure 4:
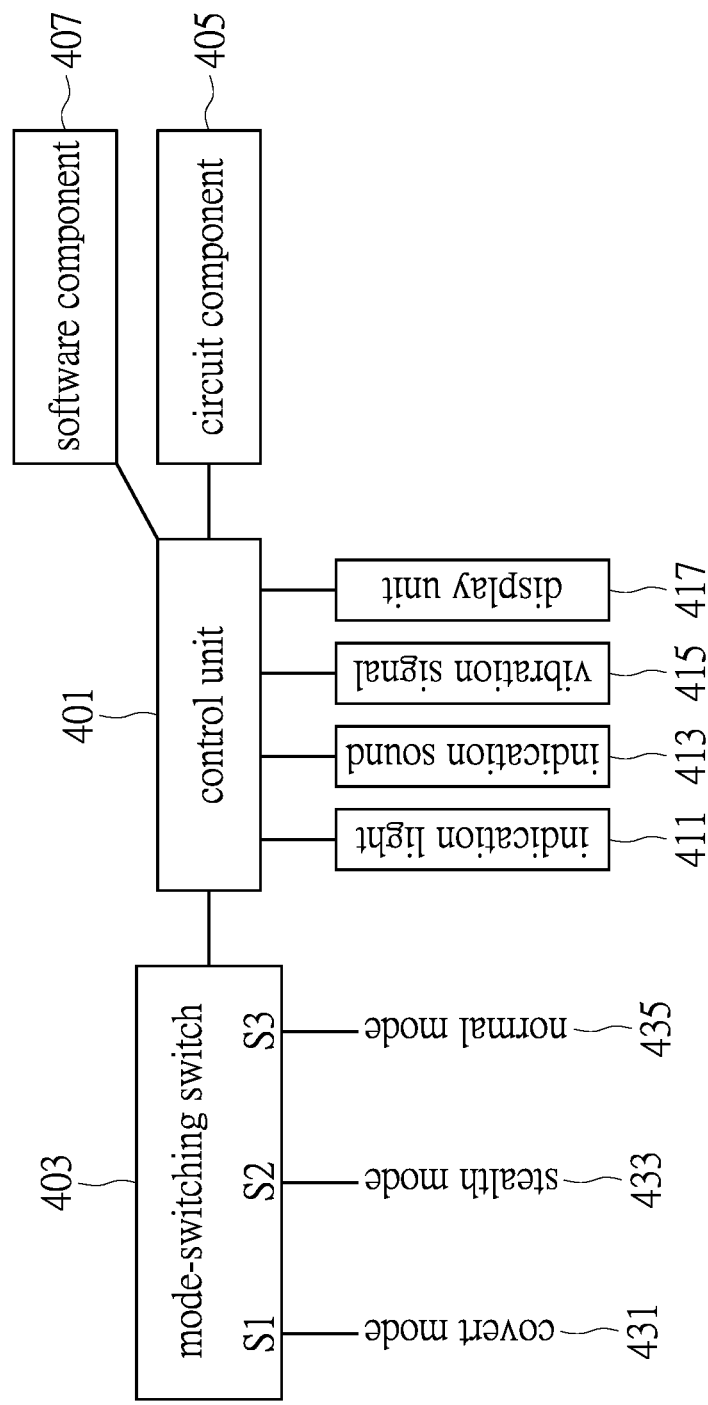
FIG. 4 is a schematic diagram depicting an operation-indication mode switching structure that is used to switch multiple operation-indication modes in one embodiment of the present disclosure.

Further, according to the schematic diagrams shown in FIG. 2B and FIG. 4, the device provides three gear positions through a design of a switching structure and multiple signal terminals. The three gear positions respectively correspond to different operation-indication modes via signals. The operation-indication mode switching structure and the circuit are able to perform switching so that the device operates under a first operation-indication mode S1, a second operation-indication mode S2, or a third operation-indication mode S3. The three operation-indication modes include a covert mode 431, a stealth mode 433, and a normal mode 435. A control unit 401 of the device determines to turn on or turn off an indication light 411, an indication sound 413, a vibration signal 415, and a display unit 417 based on any of the operation-indication modes, so as to show the operating status of the device through the indication functions.

Therefore, according to the embodiment shown in FIG. 4, the control unit 401 is used to control a software component 407 and a circuit component 405 of the device. The control unit 401 is electrically connected with a mode-switching switch 403 that has the above-described operation-indication mode switching structure. The user can manipulate the operation-indication mode switching structure to any of the gear positions as shown in the diagram according to needs. Afterwards, the mode-switching switch 403 generates an operation-indication mode switching signal. According to one of the embodiments of the present disclosure, the mode-switching switch 403 can be a magnetic-controlled switch that is used to conduct or short-circuit a switch of a specific circuit according to a magnetic field formed in the device by an electric power, by which the operation-indication mode switching signal is generated.

When the control unit 401 of the device receives a signal that is generated when the mode-switching switch 403 being implemented by the switching mechanism conducts or short-circuits one of the multiple signal terminals, the signal forms the operation-indication mode switching signal that is configured to correspond to a first operation-indication mode S1, a second operation-indication mode S2, and a third operation-indication mode S3. The control unit 401 then determines one of the multiple operation-indication modes according to the operation-indication mode switching signal and performs a corresponding indication function of the device.

According to one embodiment of the present disclosure, when the device is required to operate with a covert effect, a user can manipulate the mode-switching switch to switch to a position of the first operation-indication mode S1 that leads to the covert mode 431. Under the covert mode 431, a terminal contact of the operation-indication mode switching structure generates a signal when the terminal contact is conducted or short-circuited. The control unit 401 then turns off all of the indication functions of the device after receiving the signal under the covet mode 431. For example, under the covert mode 431, the device is completely covert when the indication light 411 is turned off, the indication sound 413 is muted, the vibration signal 415 is turned off, and a display of the display unit 417 of the device is also turned off.

The device also provides the stealth mode 433. The device is switched to the stealth mode 433 when the user manipulates the mode-switching switch to switch to a position of the second operation-indication mode S2. The terminal contact of the operation-indication mode switching structure generates a signal when the terminal contact is conducted or short-circuited. The control unit 401 only turns off part of the multiple indication functions when receiving the signal. For example, under the stealth mode 433, the indication sound 413 and the indication light 411 are turned off, but the functions of the display of the display unit 417 and the vibration signal 415 are still turned on.

If the user manipulates the mode-switching switch to switch to the gear position of the third operation-indication mode S3, the control unit 401 operates the device under the normal mode 435 according to a signal generated by the terminal contact of the operation-indication mode switching structure. Accordingly, the control unit 401 turns on all of the indication functions of the device.

Figure 5:
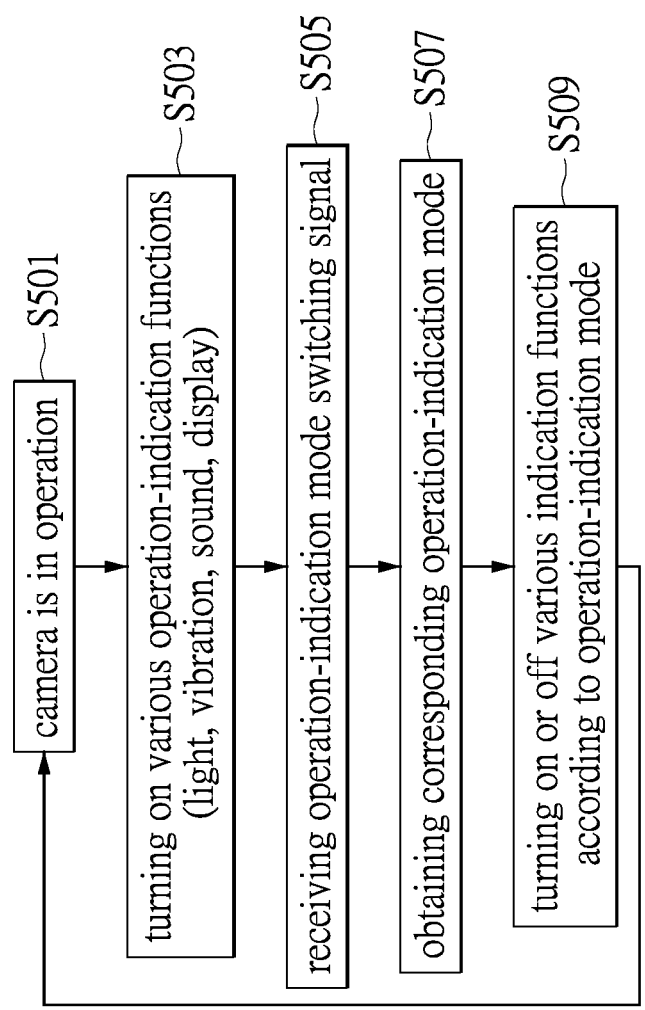
FIG. 5 is a flowchart illustrating a method for operating switching operation-indication modes according to one embodiment of the present disclosure.

FIG. 5 then shows a flowchart illustrating the operating method for the operation-indication modes according to one embodiment of the present disclosure.

Taking recording a livestream video by the body-wearable camera as an example, the camera continues to operate after being powered on (step S501), and then the various indication functions with the lights, vibration, sounds and displayed contents are selectively activated when any of the operation-indication modes of the device is read (step S503).

Then, when the user manipulates the operation-indication mode switching structure to switch the mode-switching switch to one of the operation-indication modes, the control unit receives the operation-indication mode switching signal (step S505) and one of the operation-indication modes is correspondingly determined based on the setting in the control unit (step S507). One or more of the operation-indication functions is then turned on or off according to the selected operation-indication mode (step S509). In each of the operation-indication modes, the body-wearable camera is continuously in operation.

In conclusion, according to the abovementioned embodiments relating to the operation-indication mode switching structure, the circuit, and the operating method of the present disclosure, the operation-indication mode switching structure can be implemented by a button, a rotatable wheel, or a lever disposed on the device. The device embodies multiple operation-indication modes through the operation-indication mode switching structure that allows the operation-indication function of the device to be controlled by the control circuit under a covert mode, a stealth mode, and a normal mode. In particular, the operation-indication modes can be applied to the body-wearable camera worn by a policeman or a security that performs a specialized or an emergency mission. In addition to continuously performing high-quality video evidence collection, it is necessary to conceal the operation-indication functions of the device in order to avoid affecting the mission.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A device, comprising:
   a main switch for activating the device to start or stop recording;
   a wheel switch disposed around a circumference of the main switch and rotatable to select a category from a plurality of categories for categorizing a video clip captured by the device; and
   a mode-switching switch disposed at a circumference of the wheel switch and configured to move along a predefined arc segment of the circumference of the wheel switch to switch multiple operation-indication modes of the device for being selectively connected with one of multiple signal terminals, wherein the multiple signal terminals are connected with a control unit;
   wherein the control unit receives an operation-indication mode switching signal generated by one of the multiple signal terminals conducted or short-circuited by the mode-switching switch, the operation-indication mode switching signal corresponds to one of the multiple operation-indication modes, the control unit controls multiple indication functions of the device according to one of the multiple operation-indication modes to be switched to, and at least one of the multiple indication functions controlled by the control unit based upon the one of the multiple operation-indication modes to be switched to is a muting of sound originating from a speaker.

2. The device according to claim 1, comprising an indication light disposed within the main switch.

3. The device according to claim 1, wherein the multiple signal terminals are three signal terminals, and the mode-switching switch is configured to move to at least three positions along the predefined arc segment to switch between the three signal terminals.

4. The device according to claim 1, wherein the multiple operation-indication modes include a covert mode, a stealth mode, and a normal mode.

5. The device according to claim 2, wherein, under the covert mode, the control unit turns off all of the multiple indication functions of the device; under the stealth mode, the control unit turns off some of the multiple indication functions of the device; and, under the normal mode, the control unit turns on all of the multiple indication functions of the device.

6. The device according to claim 1, wherein the multiple indication functions of the device include one or more indication lights, a vibration signal, and displaying an operating status of the device via a display unit.

7. The device according to claim 6, wherein the multiple operation-indication modes include a covert mode, a stealth mode, and a normal mode.

8. The device according to claim 7, wherein, under the covert mode, the control unit turns off all of the multiple indication functions of the device; under the stealth mode, the control unit turns off some of the multiple indication functions of the device; and, under the normal mode, the control unit turns on all of the multiple indication functions of the device.

9. The device according to claim 1, wherein at least one of the multiple indication functions controlled by the control unit based upon the one of the multiple operation-indication modes to be switched is a turning on or off of a display unit.

10. The device according to claim 9, wherein at least one of the multiple indication functions controlled by the control unit based upon the one of the multiple operation-indication modes to be switched is a turning on or off of one or more indication lights.

11. A device, comprising:
a control unit;
a main switch for activating the device to start or stop recording;
a wheel switch disposed around a circumference of the main switch and rotatable to select a category from a plurality of categories for categorizing a video clip captured by the device; and
a mode-switching switch disposed at a circumference of the wheel switch and configured to move along a predefined arc segment of the circumference of the wheel switch, wherein the mode-switching switch is electrically connected with the control unit, the mode-switching switch is used to switch multiple operation-indication modes of the device, the mode-switching switch is selectively connected with one of multiple signal terminals, and the multiple signal terminals are connected with the control unit of the device;
wherein the control unit receives an operation-indication mode switching signal generated by one of the multiple signal terminals conducted or short-circuited by the mode-switching switch, the operation-indication mode switching signal corresponds to one of the multiple operation-indication modes, the control unit controls multiple indication functions of the device according to one of the multiple operation-indication modes to be switched, and at least one of the multiple indication functions controlled by the control unit based upon the one of the multiple operation-indication modes to be switched to is a muting of sound originating from a speaker.

12. The device according to claim 11, wherein the multiple operation-indication modes include a covert mode, a stealth mode, and a normal mode.

13. The device according to claim 11, wherein at least one of the multiple indication functions controlled by the control unit based upon the one of the multiple operation-indication modes to be switched is a turning on or off of a display unit.

14. The device according to claim 11, comprising an indication light disposed within the main switch.

15. The device according to claim 11, wherein the multiple signal terminals are three signal terminals, and the mode-switching switch is configured to move to at least three positions along the predefined arc segment to switch between the three signal terminals.

16. The device according to claim 11, wherein the multiple indication functions of the device include one or more indication lights, a vibration signal, and displaying an operating status of the device via a display unit.

17. The device according to claim 16, wherein the multiple operation-indication modes include a covert mode, a stealth mode, and a normal mode.

18. An operating method for an operation-indication mode switching circuit, wherein the operation-indication mode switching circuit is disposed in a device, and the operating method includes:
during an operation of the device, turning on multiple operation-indication functions by using a control unit;
receiving an operation-indication mode switching signal based upon a position of a mode-switching switch disposed at a circumference of a wheel switch configured to be rotatable to select a category from a plurality of categories of events and disposed at a circumference of a main switch configured to be pressed to start and/or stop recording of a recording device associated with the operation-indication mode switching circuit;
determining a corresponding one of multiple operation-indication modes when the control unit receives the operation-indication mode switching signal; and
turning on or off one or more of the multiple operation-indication functions according to the corresponding one of the multiple operation-indication modes.

19. The operating method of claim 18, wherein at least one of the multiple operation-indication functions turned on or off according to the corresponding one of the multiple operation-indication modes is a muting of sound originating from a speaker.

20. The operating method of claim 18, wherein at least one of the multiple operation-indication functions turned on or off according to the corresponding one of the multiple operation-indication modes is a turning on or off of a display unit.

* * * * *